United States Patent [19]

Karsten et al.

[11] 4,028,394

[45] June 7, 1977

[54] ANTIBACTERIAL AND FUNGICIDAL S-PHENYLTHIOCARBAMATES

[75] Inventors: Kenneth S. Karsten, Westport; Joseph V. Karabinos, Orange, both of Conn.

[73] Assignee: R. T. Vanderbilt Company, Inc., Norwalk, Conn.

[22] Filed: Aug. 5, 1975

[21] Appl. No.: 602,077

Related U.S. Application Data

[63] Continuation-in-part of Ser. No. 425,251, Dec. 17, 1973, abandoned.

[52] U.S. Cl. ............................ 260/455 A; 424/300; 71/67
[51] Int. Cl.$^2$ ..................................... C07C 155/02
[58] Field of Search ............... 260/455 A; 424/300; 71/67

[56] References Cited

UNITED STATES PATENTS

| 3,282,978 | 11/1966 | Swakon | 260/455 A |
| 3,476,791 | 11/1969 | Newman et al. | 260/455 A |
| 3,609,177 | 9/1971 | Richen et al. | 424/300 |
| 3,790,615 | 2/1974 | Richen et al. | 260/455 A |

FOREIGN PATENTS OR APPLICATIONS

| 645,158 | 9/1964 | Belgium | 424/300 |
| 1,139,343 | 1/1969 | United Kingdom | 424/300 |

OTHER PUBLICATIONS

Index Chemicus, 30 98794 (1968).
J. of Med. Chem. (1971) 14, p. 1244.

*Primary Examiner*—Delbert R. Phillips
*Attorney, Agent, or Firm*—Bryan & Bollo

[57] ABSTRACT

Fungicidally and bactericidally active thiocarbamates of the formula:

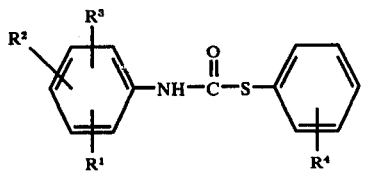

where $R^1$ represents a methyl, methoxy, halo or trifluoromethyl group; $R^2$ represents hydrogen, a methyl, methoxy, chloro or nitro group; $R^3$ represents hydrogen or a methoxy group; and $R^4$ is an ortho- or para-hydroxy group. The compounds find particular use as slimicides and as preservatives for various industrial preparations.

10 Claims, No Drawings

ANTIBACTERIAL AND FUNGICIDAL S-PHENYLTHIOCARBAMATES

BACKGROUND OF THE INVENTION

This application is a continuation in part of our copending application Ser. No. 425,251, filed: Dec. 17, 1973 now abandoned.

FIELD OF THE INVENTION

This invention relates to phenyl esters of N-phenylthiocarbamic acids which possess activity against a broad spectrum of bacteria and fungi, as well as methods of use therefor.

Industrial hydrocarbonaceous, cellulosic, and proteinaceous substances are normally susceptible to fungal degradation both during the process of manufacture and as the finished product. Furthermore, the growth of microorganisms in industrial water supplies and systems produces slime which may interfere with the normal flow of water and with the industrial process involved. This is particularly apparent in paper manufacturing processes.

Slime of the type encountered in industrial water systems consists of microorganisms, particularly bacteria, fungi, and algae and accumulations of fibers and debris that are matted together to form masses and deposits that may be stringy, pasty, rubbery, gelatinous, mealy, hard or horny.

Slime-forming microorganisms are contained in virtually all industrial waters.

Slime is objectionable from a general health standpoint in breweries, wineries, dairies, paper, and cane sugar mills and other industrial plants or establishments. Slime may interfere with the manufacturing process by plugging of screens in pulp and paper systems, thus reducing the overall efficiency of the system.

Slime is also a problem in industrial water supplies or cooling systems such as reservoirs or basins, spray ponds, or heat exchangers or in cooling towers. Of the many industrial processes where slime causes serious disadvantages, the paper-making process is faced with the slime problem in its most acute form.

Compounds which generally inhibit the formation of slime are called slimicides. The following U.S. Patents discuss slime and its formation in aqueous industrial systems and are hereby incorporated into the application by reference: U.S. Pat. Nos. 3,411,983; 3,647,610; 3,674,457; 3,250,667; 3,2250,667; 3,354,033.

The compounds of this invention are especially suitable for combatting fungal degradation and microorganism growth and find advantageous utility as slimicides for aqueous industrial systems especially in paper manufacturing systems and as preservatives and/or disinfectants for industrial and agricultural preparations.

DESCRIPTION OF THE PRIOR ART

Biologically active preparations containing esters of N-alkylthiocarbamates as active ingredients are known in the art. For example, U.S. Pat. No. 3,265,563 suggest certain phenyl N-alkylthiocarbamates as microbiocides and U.S. Pat. No. 3,330,821 states that particular S-alkenyl N-alkylthiocarbamates posses biological activity as phytotoxicants and nematocides. In addition, U.S. Pat. No. 3,714,233 sets forth certain haloalkoxy- and haloalkylthiophenyl carbamates for use as herbicides, fungicides and insecticides. Furthermore, O-phenyl N-phenylcarbamates and thiocarbamates and S-phenyl N-phenylthiocarbamates are described as having been used in insecticidal, herbicidal and anthelmintic preparations in U.S. Pat. Nos. 2,990,319, 3,134,666, 3,609,177 and 3,719,702.

However, many of these compounds which have asserted utility as insecticides and pesticides fail to possess appreciable fungicidal properties and their use as microbiocides has been restricted. Significantly, notwithstanding the suggested utility of certain compounds, the specific biocidal properties of this class of compounds cannot be predicted. Thus, U.S. Pat. No. 3,330,821 states, at lines 29, et seq. of column 10, that while some generalities may be derived from study of a large number of different structures, the relationship between biological activity and structure is, to sayd the least obscure. Our observations confirm the impossibility of predicting biological activity of a member of a chemical class such as S-phenyl N-phenylthiocarbamates from the performance of certain other members of that class. It has been hypothesized, Saul Rich, et al., Connecticut Agricultural Experiment Station, New Haven, Bulletin No. 639, p. 43 (1961), that probably, instead of the thiolcarbamate residue, other moieties in the molecule are exerting the major effect on toxicity.

Thus, the particular prior art compounds may be considered as being specific and unsuggestive of other compounds of the class providing unpredictable properties, including enhanced effects, in the same and different applications.

SUMMARY OF THE INVENTION

We have discovered that antimicrobial and antifungal properties against gram positive and gram negative bacteria and fungi are exhibited by compounds of the general formula:

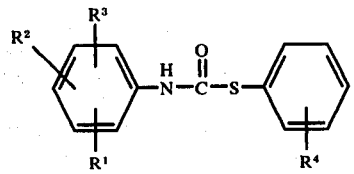

where $R^1$ represents a methyl, methoxy, halo, or trifluoromethyl group; $R^2$ represents hydrogen a methyl, methoxy, chloro or nitro group; $R^3$ represents hydrogen or a methoxy group; and $R^4$ is an orth- or para-hydroxy group.

The compounds of the present invention can be prepared by reacting the appropriate thiophenol with the appropriate isocyanate by known methods as described in U.S. Pat. Nos. 3,046,189 and 3,714,233.

Industrial products including adhesives, glue, organic binders, paints, emulsions, polymers, dyeing and printing pastes, thickeners, organic products such as soya flour, wheat flour, and starch may be preserved and/or disinfected with the compounds of this invention. The compounds can also be used as slime control agents in various aqueous industrial systems and in paper manufacture.

Thus, it is an object of this invention to provide compounds possessing antifungal and antibacterial activity against a broad spectrum of gram positive and gram negative bacteria and fungi.

Another object of this invention is to provide a compound for use in treatment of aqueous industrial systems to inhibit slime formation. A further object of this invention is to provide a compound for use as a slimicide in an aqueous industrial system associated with paper manufacture.

The compounds according to the above general formula may be advantageously used in formulations and prepartions in accordance with the methods known in the art, into a wide variety of suitable application vehicles exemplary of which are solid forms such as dusts, sprinkling agents and coated granules, dispersible concentrates including emulsions, pastes and wettable powders as well as solutions, aerosols and the like. Thus, the compounds may be readily included, as preservatives and/or disinfectants, in industrial and agricultural products subject to attack by bacteria and fungi and the provision of compounds for such inclusion is a further object of this invention.

The relative proportions of the biologically active compound as well as inert carriers, solvents, dispersants and the like may vary within broad limits since the amount required will be dependent largely upon the fungicidal or biocidal effect sought in the particular application. These limits will be readily ascertainable to those skilled in the art from the examples hereinafter presented and further determination of the effective amount needed for a given application can be made according to known practice. For example, it has been found that a biostatically effective amount for control of slime in paper manufacture is 0.1 PPM to 5000 PPM and for preserving cutting oil is from 0.1% to 5% by weight.

DESCRIPTION OF THE PREFERRED EMBODIMENTS

The following examples are illustrative of embodiments of the invention.

EXAMPLE 1

To 12.6 g. of 2-mercaptophenol dissolved in 50 ml. acetone was added 14.7 g. of 2,6-dimethylphenyl isocyanate together with 0.1 g. of triethylenediamine, with warming. The adduct crystallized after several days and was collected by filtration and washed with an 80:20 mixture of hexane and acetone. The formed 2-hydroxyphenol N-(2,6-dimethylphenyl)-thiocarbamate weighed 13.7 g. (50% yield) and had a melting point of 121°–4° C.

The following compounds may be prepared in a similar manner:

TABLE 1

| No. | $R^3$ | $R^1$ | $R^2$ | $R^4$ | m.p. |
|---|---|---|---|---|---|
| 1 | H | *3-Cl | 4-Cl | 2-OH | 147–55° C. |
| 2 | H | 2-F | H | 2-OH | 123–5° C. |
| 3 | H | 2-CH$_3$O | 4-Cl | 2-OH | 135–7° C. |
| 4 | H | 2-CH$_3$O | 5-CH$_3$O | 2-OH | 119–21° C. |
| 5 | 4-CH$_3$O | 2-CH$_3$O | 5-Cl | 2-OH | 147–9° C. |
| 6 | H | 2-CF$_3$ | H | 2-OH | 106–8° C. |
| 7 | H | 2-Cl | 6-CH$_3$ | 2-OH | 147–150° C. |
| 8 | H | 2-CH$_3$ | 4-Cl | 2-OH | 140–3° C. |
| 9 | H | 3-CF$_3$ | 4-Cl | 2-OH | 137–40° C. |
| 10 | H | 3-CH$_3$ | 4-CH$_3$ | 2-OH | 125–7° C. |
| 11 | H | 2-CH$_3$ | 5-NO$_2$ | 2-OH | 293–5° C. |
| 12 | H | 2-CF$_3$ | H | 4-OH | 171–3° C. |
| 13 | H | 2-CH$_3$O | 5-CH$_3$O | 4-OH | 148–50° C. |
| 14 | H | 2-Cl | 6-CH$_3$ | 4-OH | 121–3° C. |
| 15 | H | 2-F | H | 4-OH | 179–82° C. |
| 16 | H | 3-CF$_3$ | 4-Cl | 4-OH | 176–8° C. |
| 17 | 6-CH$_3$O | 3-Cl | 4-CH$_3$O | 4-OH | 176–8° C. |

*The numbers designate the position of the substituents.

EXAMPLE 2

Microbicidal Activity a. Agar Incorporation Technique

The fungistatic efficacy of the compounds of this invention when in contact with growing fungi in artificial media was determined as follows. Stock solutions of test compounds were prepared by dissolving in acetone and added to agar medium at 45° C. The hardened agar was inoculated with spores of the fungus *Aspergillus niger*. The inoculated plates were incubated for 4 days at 28° C. and 95% relative humidity. The results, reported as the lowest parts per million of the test compound showing no growth or sporulation, are listed in Table 2 below.

b. Penicillin Button Assay

The antibacterial effect of the compounds of this invention was determined as follows. Penicillin buttons 13(mm) were placed in test chemical solutions of various dilutions for 5 min., then removed and dried on paper towel. The buttons were placed on agar inoculated with *Bacillus subtilis*, *Staphylococcus aureus*, and *Salmonella typhosa* and incubated for 24 hrs. at 37° C. The results, reported as lowest parts per million exhibiting the zone of inhibition, are listed in Table 2 below.

TABLE 2

| No. | Active Substance | Lowest effective concentration (ppm) | | | |
|---|---|---|---|---|---|
| | | A.niger | B.subtilis | S. aureus | S.typhosa |
| 1 | 2-Hydroxyphenyl N-(3,4-dichlorophenyl)thiocarbamate | 100 | 20 | 10 | 20 |
| 2 | 2-Hydroxyphenyl N-(2-fluorophenyl)thiocarbamate | 100 | 50 | 100 | 50 |
| 3 | 2-Hydroxyphenyl N-(4-chloro-2-methoxyphenyl)thiocarbamate | 100 | 50 | 50 | 100 |
| 4 | 2-Hydroxyphenyl N-(2,5-dimethoxyphenyl)thiocarbamate | 100 | 50 | 100 | 50 |
| 5 | 2-Hydroxyphenyl N-(5-chloro-2,4-dimethoxyphenyl)thiocarbamate | 100 | 100 | 100 | 100 |
| 6 | 2-Hydroxyphenyl N-(2-trifluoromethylphenyl)thiocarbamate | 100 | 50 | 100 | 50 |
| 7 | 2-Hydroxyphenyl N-(2-chloro-6-methylphenyl)thiocarbamate | 300 | 50 | 20 | 20 |
| 8 | 2-Hydroxyphenyl N-(4-chloro-2-methylphenyl)thiocarbamate | 100 | 50 | 100 | 50 |
| 9 | 2-Hydroxyphenyl N-(4-chloro-3-trifluoromethylphenyl)thiocarbamate | 100 | 50 | 100 | 20 |
| 10 | 2-Hydroxyphenyl N-(3,4-dimethylphenyl)thiocarbamate | 300 | 100 | 50 | 100 |
| 11 | 2-Hydroxyphenyl N-(2-methyl-5-nitrophenyl)thiocarbamate | 300 | 100 | 300 | 100 |
| 12 | 4-Hydroxyphenyl N-(2-trifluoromethylphenyl)thiocarbamate | 300 | 500 | 300 | 100 |
| 13 | 4-Hydroxyphenyl N-(2,5-dimethoxyphenyl)thiocarbamate | 300 | 300 | 300 | 100 |
| 14 | 4-Hydroxyphenyl N-(2-chloro-6-methylphenyl)thiocarbamate | 300 | 300 | 300 | 300 |
| 15 | 4-Hydroxyphenyl N-(2-fluorophenyl)thiocarbamate | 300 | 300 | 300 | 100 |
| 16 | 4-Hydroxyphenyl N-(4-chloro-3-trifluoromethylphenyl)thiocarbamate | 300 | 100 | 100 | 100 |
| 17 | 4-Hydroxyphenyl N-(3-chloro-4,6-dimethoxyphenyl)thiocarbamate | 500 | 500 | 500 | 100 |

The results set forth in Table 2 demonstrate the good microbicidal effect against bacteria and fungi displayed by the compounds of this invention. The unexpected effectiveness of the compounds of this invention is even more apparent when the results set forth in Table 2 are compared with the results obtained with structurally similar compounds as set forth in Table 3. In particular; the activity of the 2-hydroxyphenyl N-(2-chloro-6-methylphenyl) thiocarbamate is surprising, considering the lack of effectiveness of either the corresponding unsubstituted S-benzyl ester or the S-(3-methylphenyl) ester.

TABLE 3

RESULTS)
Lowest effective concentration (ppm) M=1000

| Test Substance | A. niger | B. subtilis | S. aureus | S. typhosa |
|---|---|---|---|---|
| 3-Methylphenyl N-(2-chloro-6-methylphenyl)thiocarbamate | M | +10M | +10M | +10M |
| Benzyl N-(2-chloro-6-methylphenyl)thiocarbamate | +M | +10M | +10M | +10M |
| 4-Chlorophenyl N-(2-trifluoromethylphenyl)thiocarbamate | M | 10M | 10M | 500 |
| 4-Methoxyphenyl N-(2-fluorophenyl)thiocarbamate | M | +10M | +10M | 10M |
| 4-t-butylphenyl N-(2,3-dichlorophenyl)thiocarbamate | +M | +10M | 10M | +10M |
| 3-Methylphenyl N-(3,5-dimethylphenyl)thiocarbamate | 500 | +10M | +10M | M |
| 3-Methylphenyl N-(2-chloro-5-nitrophenyl)thiocarbamate | +M | +10M | +10M | +10M |
| 4-Chlorobenzyl N-(3,4-dimethylphenyl)thiocarbamate | +M | +10M | +10M | +10M |

EXAMPLE 3

Inhibition of Slime Formation

As a slimicide test, penicillin assay filter paper discs were soaked in test solutions containing varying percentages of compounds of this invention and placed on agar seeded with slime culture obtained from cooling water system, and from a paper mill. The lowest amount required to inhibit a minimum of a 2mm zone is reported in Table 4 and indicates excellent retardant properties.

EXAMPLE 4 a. Preservation of Adhesives

The toxicant compounds of this invention were added in concentrations of 500 ppm to an adhesive formulation containing casein and soya flour. As shown in Table 5, the compounds of this invention inhibited microbial growth for extended periods of time as shown by the excellent retarding properties with regard to formation of odor or spoilage.

b. Preservation of Cutting Oil

Cutting oil containing 500 ppm of toxicant compounds of this invention was inoculated with a spoiled oil sample to yield an initial count of 100,000 to 250,000 microorganisms per ml of diluted oil. Plate counts using agar as basic medium were made on serial dilutions of the inoculated oil and incubated at 37° C for 0, 7, 14, 21 and 28 days. Good results were observed with regard to reduction of microorganisms in the treated oil sample as compared to the untreated control, as reported in Table 5.

Thus, there has been disclosed a group of certain S-phenyl N-phenylthiocarbamates, and methods of preparation thereof and use therefor, processing antibacterial and anti-fungal activity against a broad spectrum of bacteria and fungi encountered in industrial and agricultural areas.

TABLE 4

| No. | Active Ingredient | ppm Required to Inhibit a 2mm Zone | |
|---|---|---|---|
| | | A | B |
| 8 | 2-Hydroxyphenyl N-(4-chloro-2-methylphenyl)thiocarbamate | 100 | 10M |
| 9 | 2-Hydroxyphenyl N-(4-chloro-3-trifluoromethylphenyl)thiocarbamate | 100 | 10M |
| 10 | 2-Hydroxyphenyl N-(3,4-dimethylphenyl)thiocarbamate | 100 | +10M |
| 12 | 2-Hydroxyphenyl N-(2-trifluoromethylphenyl)thiocarbamate | 50 | 10M |
| 13 | 2-Hydroxyphenyl N-(2,5-dimethoxyphenyl)thiocarbamate | 100 | 10M |
| 14 | 2-Hydroxyphenyl N-(2-chloro-6-methylphenyl)thiocarbamate | 50 | M |
| 15 | 2-Hydroxyphenyl N-(2-fluorophenyl)thiocarbamate | 100 | 10M |

A= Cooling water slime
B= Paper Mill Slime
M= 1,000

TABLE 5

| | | Days Protected From Spoilage | | Preservative Effect |
|---|---|---|---|---|
| No. | Active Ingredients | Soya-based Adhesive | Casein-based Adhesive | In Cutting Oil After 21 Days |
| | None | 3 | 3 | None |
| 7 | 2-Hydroxyphenyl N-(2-chloro-6-methylphenyl)-thiocarbamate | 219 | 219 | Good |
| 8 | 2-Hydroxyphenyl N-(4-chloro-2-methylphenyl)-thiocarbamate | 268+ | 201 | Good |
| 9 | 2-Hydroxyphenyl N-(4-chloro-3-trifluromethylphenyl)-thiocarbamate | 268+ | 89 | Good |
| 10 | 2-Hydroxyphenyl N-(3,4-dimethylphenyl)thiocarbamate | 268+ | 246 | Good |
| 11 | 2-Hydroxyphenyl N-(2-methyl-5-nitrophenyl)-thiocarbamate | 268+ | 268+ | Good |
| 12 | 2-Hydroxyphenyl N-(2-trifluoromethylphenyl)-thiocarbamate | 268+ | 89 | Good |
| 13 | 2-Hydroxyphenyl N-(2,5-dimethoxyphenyl)- | | | |

TABLE 5-continued

| No. | Active Ingredients | Days Protected From Spoilage | | Preservative Effect In Cutting Oil After 21 Days |
| --- | --- | --- | --- | --- |
| | | Soya-based Adhesive | Casein-based Adhesive | |
| | thiocarbamate | 268+ | 201 | Good |
| 15 | 2-Hydroxyphenyl N-(2-fluorophenyl)thiocarbamate | 268+ | 89 | Good |

+ = still effective at the end of incubation period.

We claim:

1. The compound 2-hydroxyphenyl N-(3,4-dichlorophenyl)-thiocarbamate.
2. The compound 2-hydroxyphenyl N-(4-chloro-2-methoxyphenyl)thiocarbamate.
3. The compound 2-hydroxyphenyl N-(2,5-dimethoxyphenyl)-thiocarbamate.
4. The compound 2-hydroxyphenyl N-(5-chloro-2,4-dimethoxyphenyl)thiocarbamate.
5. The compound 2-hydroxyphenyl N-(2-chloro-6-methylphenyl)thiocarbamate.
6. The compound 2-hydroxyphenol N-(4-chloro-2-methyl-phenyl)-thiocarbamate.
7. The compound 2-hydroxyphenyl N-(3,4-dimethylphenyl)-thiocarbamate.
8. The compound 2-hydroxyphenyl N-(2-methyl-5-nitrophenyl)-thiocarbamate.
9. The compound 4-hydroxyphenyl N-(2-fluorophenyl)-thiocarbamate.
10. The compound 4-hydroxyphenyl N-(3-chloro-4,6-dimethoxyphenyl)thiocarbamate.

* * * * *

UNITED STATES PATENT OFFICE
CERTIFICATE OF CORRECTION

Patent No. 4,028,394  Dated June 7, 1977

Inventor(s) Kenneth S. Karsten

It is certified that error appears in the above-identified patent and that said Letters Patent are hereby corrected as shown below:

Column 1, line 49, "3,2250,667" should read -- 3,881,008 --.

Column 1, line 62, "suggest" should read -- suggests --.

Column 2, line 16, "to sayd" should read -- to say --.

Column 2, line 47, "hydrogen a methyl" should read -- hydrogen, a methyl --.

Column 2, line 49, "orth-" should read -- ortho --.

Signed and Sealed this

First Day of November 1977

[SEAL]

Attest:

RUTH C. MASON  - LUTRELLE F. PARKER
Attesting Officer  Acting Commissioner of Patents and Trademarks